US008238745B2

(12) United States Patent
Oguma

(10) Patent No.: US 8,238,745 B2
(45) Date of Patent: Aug. 7, 2012

(54) COLLECTION OF DATA FROM AN OPTICAL CHANNEL MONITOR WITHOUT CAUSING A MALFUNCTION OF A TRANSMISSION APPARATUS

(75) Inventor: Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 12/341,853

(22) Filed: Dec. 22, 2008

(65) Prior Publication Data

US 2009/0162054 A1    Jun. 25, 2009

(30) Foreign Application Priority Data

Dec. 21, 2007   (JP) ................................. 2007-330059

(51) Int. Cl.
*H04B 10/08* (2006.01)
*H04B 10/00* (2006.01)
*G01R 35/00* (2006.01)

(52) U.S. Cl. .................. 398/34; 398/25; 398/9; 398/38; 341/118; 341/200; 324/115; 356/446; 356/484

(58) Field of Classification Search .................... 398/34, 398/25, 9, 38
See application file for complete search history.

(56) References Cited

U.S. PATENT DOCUMENTS

| 5,701,261 | A  | * | 12/1997 | Evans ............................ 708/300 |
| 6,841,987 | B2 | * | 1/2005  | Clegg et al. .................... 324/115 |
| 7,551,478 | B2 | * | 6/2009  | Kanno ..................... 365/185.09 |
| 7,643,759 | B2 | * | 1/2010  | Tanaka ........................... 398/177 |
| 2003/0030859 | A1 | * | 2/2003 | Youn et al. ..................... 359/110 |
| 2003/0098682 | A1 | * | 5/2003 | Jin et al. ...................... 324/76.21 |
| 2004/0027949 | A1 | * | 2/2004 | Matsuura et al. ........... 369/47.51 |
| 2004/0088406 | A1 | * | 5/2004 | Corley et al. .................. 709/224 |
| 2005/0019032 | A1 | * | 1/2005 | Scarth et al. .................... 398/38 |
| 2005/0188138 | A1 | * | 8/2005 | Park et al. ...................... 710/113 |
| 2005/0237882 | A1 | * | 10/2005 | Honobe ..................... 369/44.37 |
| 2006/0031019 | A1 | * | 2/2006 | Staton et al. ..................... 702/19 |
| 2006/0233225 | A1 | * | 10/2006 | Omoto .......................... 375/149 |
| 2007/0003281 | A1 | * | 1/2007 | Mitchell et al. .................. 398/38 |
| 2007/0140376 | A1 | * | 6/2007 | Kang ............................ 375/296 |
| 2009/0177932 | A1 | * | 7/2009 | Abts et al. ...................... 714/704 |

FOREIGN PATENT DOCUMENTS

| JP | 1996264871 A |   | 10/1996 |
| JP | 2006286918 A | * | 10/2006 |
| JP | 2006310963 A |   | 11/2006 |

\* cited by examiner

*Primary Examiner* — Shi K Li
*Assistant Examiner* — Oommen Jacob

(57) ABSTRACT

A method of collecting data from an optical channel monitor for monitoring the power of a wavelength-division multiplexed light signal at each wavelength is disclosed. The total light power is analog-to-digital converted by an A/D converter. The data of the total light power which has been analog-to-digital converted is compared with a reference light power by a comparator for each conversion, and when the difference between the total light power and the reference light power exceeds a predetermined threshold, a power fluctuation flag is turned ON. After the comparison, the above process of the analog-to-digital conversion and the comparison is iterated until the optical channel monitor completes the data collection for each wavelength. Thereafter, the processor determines whether the power fluctuation flag is ON or not. When the power fluctuation flag is ON, the processor discards the currently collected data and maintains the data which were collected immediately before.

9 Claims, 5 Drawing Sheets

COLLECTION OF DATA FROM AN OPTICAL CHANNEL MONITOR WITHOUT CAUSING A MALFUNCTION OF A TRANSMISSION APPARATUS

The present application is based upon and claims the priority of Japanese patent application No. 2007-330059 filed on Dec. 21, 2007, the disclosure of which is herein incorporated herein in its entirety by reference.

BACKGROUND OF THE INVENTION

1. Field of the Invention

The present invention relates to a method of collecting data from an optical channel monitor which monitors the power of wavelength-division multiplexed light at each wavelength.

2. Description of the Related Art

With expansion of the application of wavelength division multiplexing (WDM) technologies, there is a growing demand for optical channel monitors as a means for directly monitoring the level of a light signal at each wavelength within a transmission fiber line without multiplexing/demultiplexing the signals.

Optical channel monitors are roughly divided into two types. One is a monochromator type wherein an optical filter which is equipped within the monochromator, is swept in wavelength and the output of the filter is received by a photo-detector to monitor the level at each wavelength of incoming light. The other is a polychromator type wherein a plurality of photo-detectors are placed at the demultiplexing side of a wavelength demultiplexer such as a diffraction grating and wherein the level of the signal received by each detector is swept to monitor the light level at each wavelength of incoming light.

For example, JP2006-286918A discloses an optical amplification device for use in a wavelength division multiplexing system. This patent literature describes that first, second, and third optical dividers are mounted in order from an input end to an output end of the device; the powers of signal lights having different wavelengths are monitored at the branch path of the second optical divider; and are measured for each wavelength by means of an optical channel monitor which is connected to the branch path of the third optical divider.

Both types are unable to simultaneously monitor the signal lights of every wavelength within a transmission line fiber. Accordingly, these types are problematic in that when the level of incident light to the optical monitor undergoes a change due to, for example, a fluctuation of the light level in the transmission line during the sweeping operation, the error of the data measured during the fluctuation becomes large. This can lead to the malfunction of a transmission apparatus which accommodates the optical channel monitor because it performs alarm operation etc., based on the result of detection of the optical channel monitor. Further, in order to prevent the aforementioned malfunction, processing such as averaging of the monitored values is required, resulting in sacrificing the response speed of the optical channel monitor.

SUMMARY OF THE INVENTION

It is an object of the present invention to provide a method of collecting data from an optical channel monitor and a transmission apparatus which prevent the malfunction of the apparatus when the error of data measured during a fluctuation of the light level in the transmission line becomes large.

The power level of each signal light which enters the optical channel monitor and which is swept, is monitored. When fluctuation in the power levels above a predetermined threshold is detected, the light power of each channel and the total light power currently collected from the optical channel monitor are discarded and the data that were collected immediately before are maintained.

The present invention provides the following advantages:

1. Malfunctions of the apparatus can be prevented beforehand because when fluctuations of the levels of incoming signals to the optical channel monitor are large, the collected data are discarded and the data that were collected immediately before are maintained.

2. An alarm operation of the apparatus can be improved because countermeasures, such as averaging of the monitored values, protection etc. against malfunctions are not needed.

The above and other objects, features and advantages of the present invention will become apparent from the following description with reference to the accompanying drawings which illustrate examples of the present invention.

EXEMPLARY EMBODIMENTS

First Exemplary Embodiment

Figure 1:
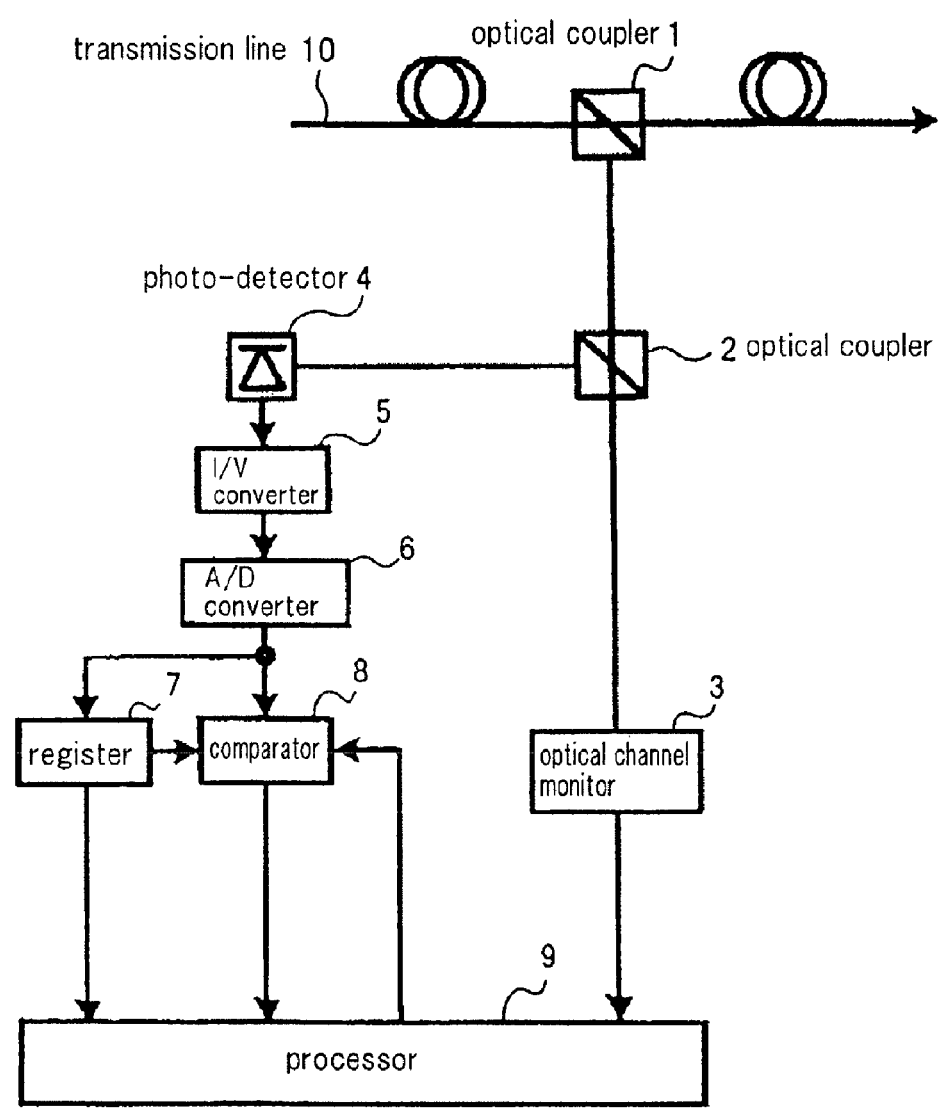
FIG. 1 is a block diagram showing a transmission apparatus according to first to fourth exemplary embodiments of the present invention.

Referring to FIG. 1, there is shown a transmission apparatus according to a first exemplary embodiment of the present invention which comprises optical couplers 1 and 2, optical channel monitor 3, photo-detector 4, I/V converter 5, A/D converter 6, register 7, comparator 8, and processor 9.

Optical coupler 1 serves to branch part of the wavelength-division multiplexed signal light in transmission line 10 to optical coupler 2. As optical coupler 1, an optical coupler having the tap ratio at the input side of 10 to 20 dB is typically used. Optical coupler 2 serves to branch the wavelength-division multiplexed signal light that has been entered to photo-detector 4 and to optical channel monitor 3. Optical coupler 2 typically has a tap ratio of 3 to 20 dB. Optical channel monitor 3 is an optical device that monitors the power of signal light at each wavelength in the wavelength-division multiplexed signal light. Photo-detector 4 monitors the total power of the wavelength-division multiplexed signal light. Please note that a module (TAP-PD module) that combines optical coupler 2 and photo-detector 4 is commercially available and can be used in the present invention. I/V converter 5 is a circuit which converts the photo current flowing from photo-detector 4 into a voltage, and as converter 5, a resistive divider or a trans-impedance amplifier is usually used. A/D converter 6 quantizes the output voltage of I/V converter 5. Register 7 holds therein information regarding a reference light power and total light power. Comparator 8 compares the difference between the result of analog-to-digital conversion which is successively performed and the reference light power held in register 7 with a predetermined threshold, and when the difference exceeds the threshold, turns a power fluctuation flag ON. Processor 9 is a processor such as a CPU (Central Processor Unit), a DSP (Digital Signal Processor), etc. Processor 9 performs procedures: collection of each channel information monitored by optical channel monitor 3; input of the total light power information held in register 7; setting of the threshold to comparator 8; and discarding the currently collected data from optical channel monitor 3 when the power fluctuation flag is ON.

Figure 2:
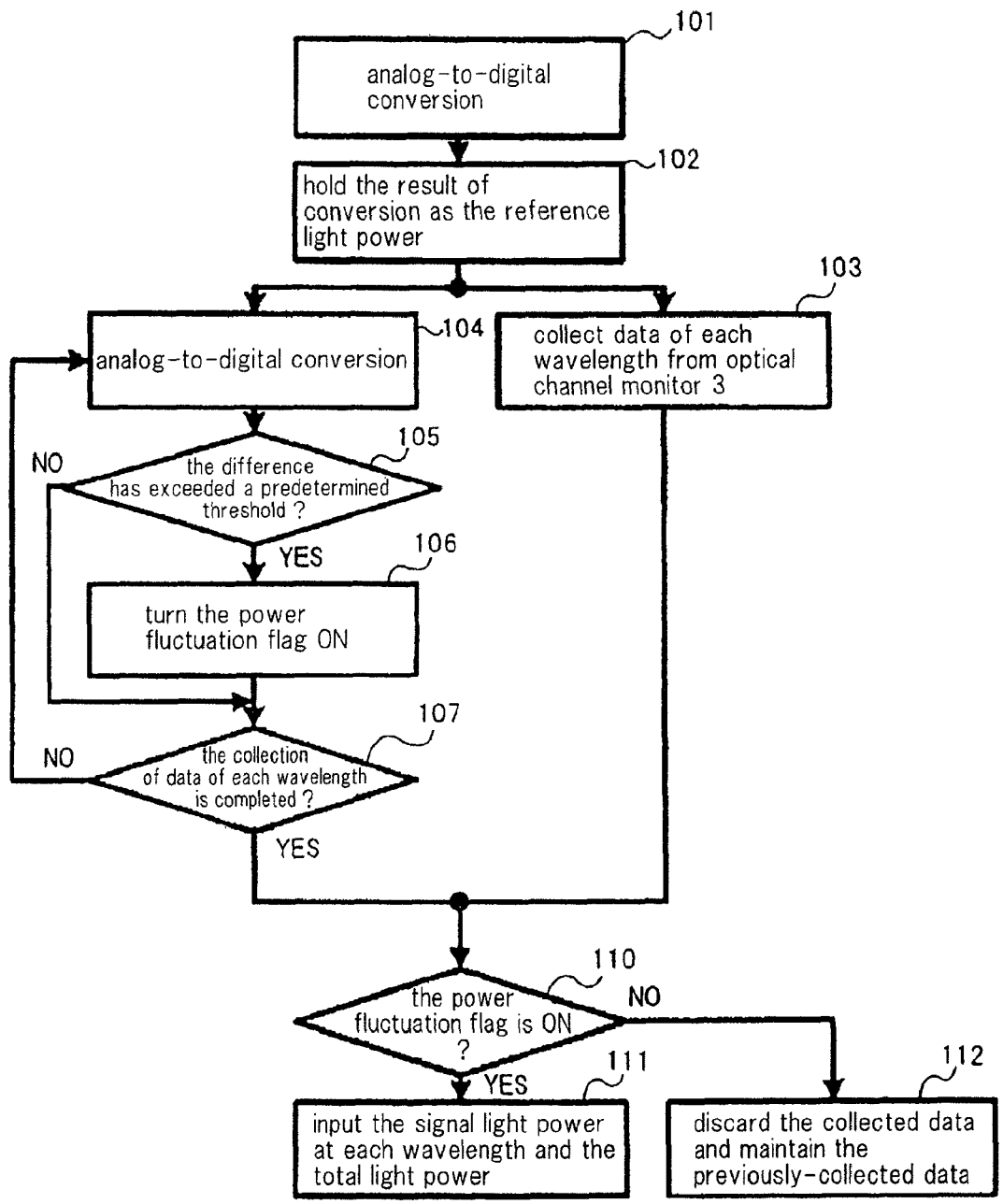
FIG. 2 is a flowchart showing the operation of the transmission apparatus according to a first exemplary embodiment of the present invention.

Next, the operation of the transmission apparatus of the present exemplary embodiment will be described with reference to FIG. 2.

First, the voltage output from I/V converter 5 which is converted from the photo current is analog-to-digital converted by A/D converter 6, the photo current being detected by photo-detector 4 from the wavelength-division multiplexed signal light transmitted through optical couplers 1, 2 (step 101). The result of conversion is held in register 7 as the reference light power (step 102).

Thereafter, optical channel monitor 3 starts the collection of data of each wavelength (step 103). Simultaneously, A/D converter 6 performs analog-to-digital conversion of the total light power (step 104). Every time the conversion is performed, comparator 8 compares the total light power data which has been analog-to-digital converted with the reference light power held in register 7 (step 105). When the difference between the total light power data and the reference light power exceeds a predetermined threshold, the power fluctuation flag is turned ON (Step 106). The threshold is appropriately determined based on fluctuation factors of the transmission line. It is on the order of 0.5 to 10 dB because a typical level fluctuation factor of the transmission line is microbending that is caused by physical contact with the transmission line fiber. After the comparison, processor 9 determines whether or not optical channel monitor 3 has completed the collection of data of each wavelength (each channel) (step 107). When the collection is not completed, processor 9 performs such a control that the above process of the analog-to-digital conversion and the comparison is iterated until the collection is completed. Since the data collection time of optical channel monitor 3 is not zero as described above, the above process of conversion and comparison is iteratively performed during the collection (typically several milliseconds to several seconds). A shorter analog-to-digital conversion cycle is more desirable. However, since there is a trade-off between the cycle and the accuracy of the analog-to-digital conversion, the cycle is typically within several microseconds to several tens of milliseconds. Thereafter, processor 9 determines whether or not the power fluctuation flag is ON (Step 110). When processor 9 has determined that the power fluctuation flag is not ON, it inputs both the signal light power at each wavelength and the total light power and performs necessary processing such as an alarm processing (step 111). When the power fluctuation flag is ON, processor 9 discards the collected data and maintains the previously-collected data (step 112).

In the present exemplary embodiment, when the fluctuation of the level of the incoming light into optical channel monitor 3 is large, the currently collected data is discarded and the data which were collected immediately before are maintained, thus preventing malfunctions of the apparatus beforehand.

Second Exemplary Embodiment

Figure 3:
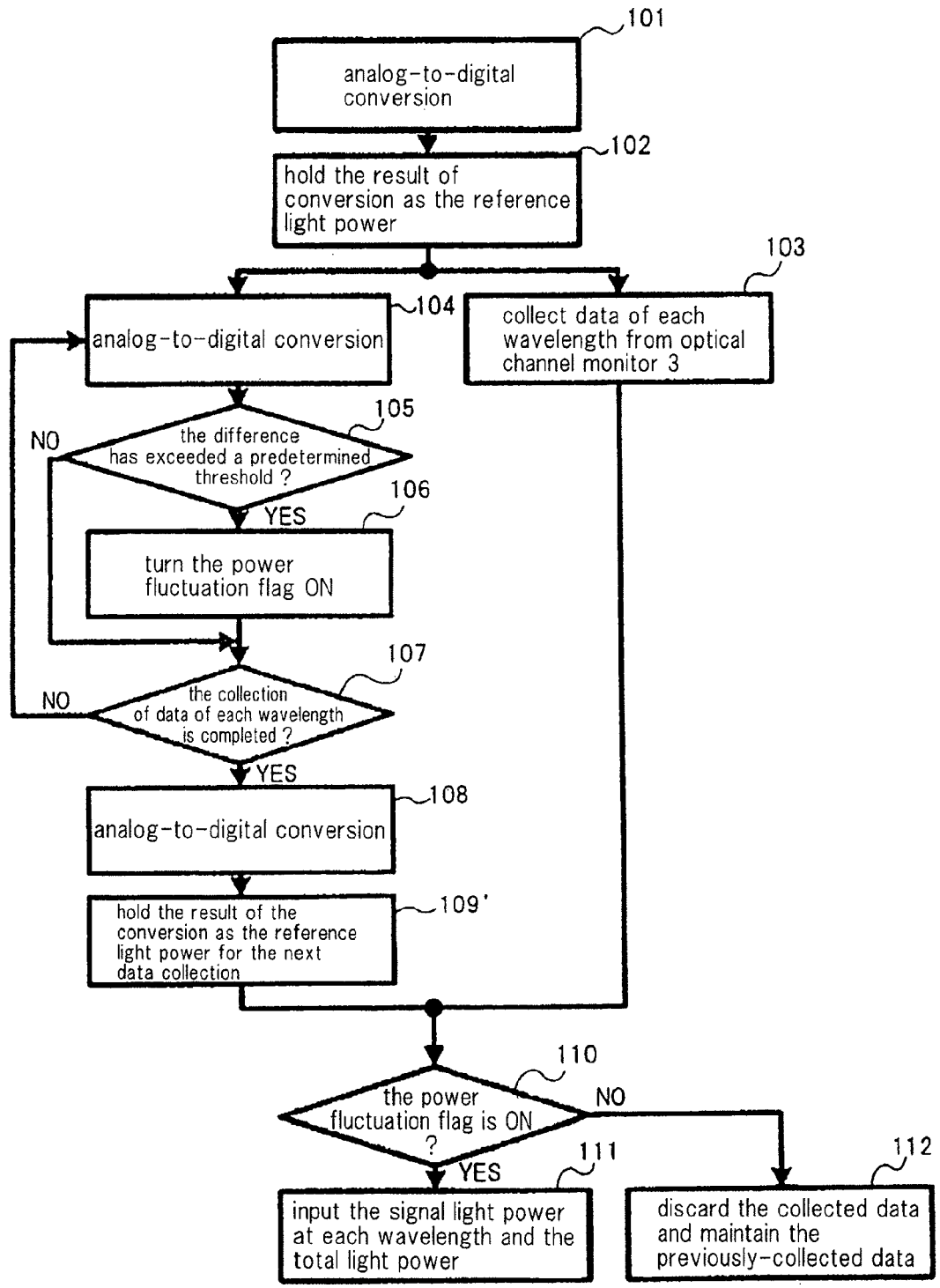
FIG. 3 is a flowchart showing the operation of the transmission apparatus according to a second exemplary embodiment of the present invention.

FIG. 3 is a flowchart showing the operation of a transmission apparatus according to a second exemplary embodiment of the present invention.

The present exemplary embodiment has the same basic configuration as that of the first exemplary embodiment, but differs from the latter in the manner in which the reference light power is set. That is, processor 9 holds the result of the analog-to-digital conversion, which is performed at the end of the current data collection period and which does not have the fluctuation level above the threshold, in register 7 as the reference light power for the next data collection period (step 108, 109'). The processings at steps 101 and 102 are performed only for the first data collection period.

Third Exemplary Embodiment

Figure 4:
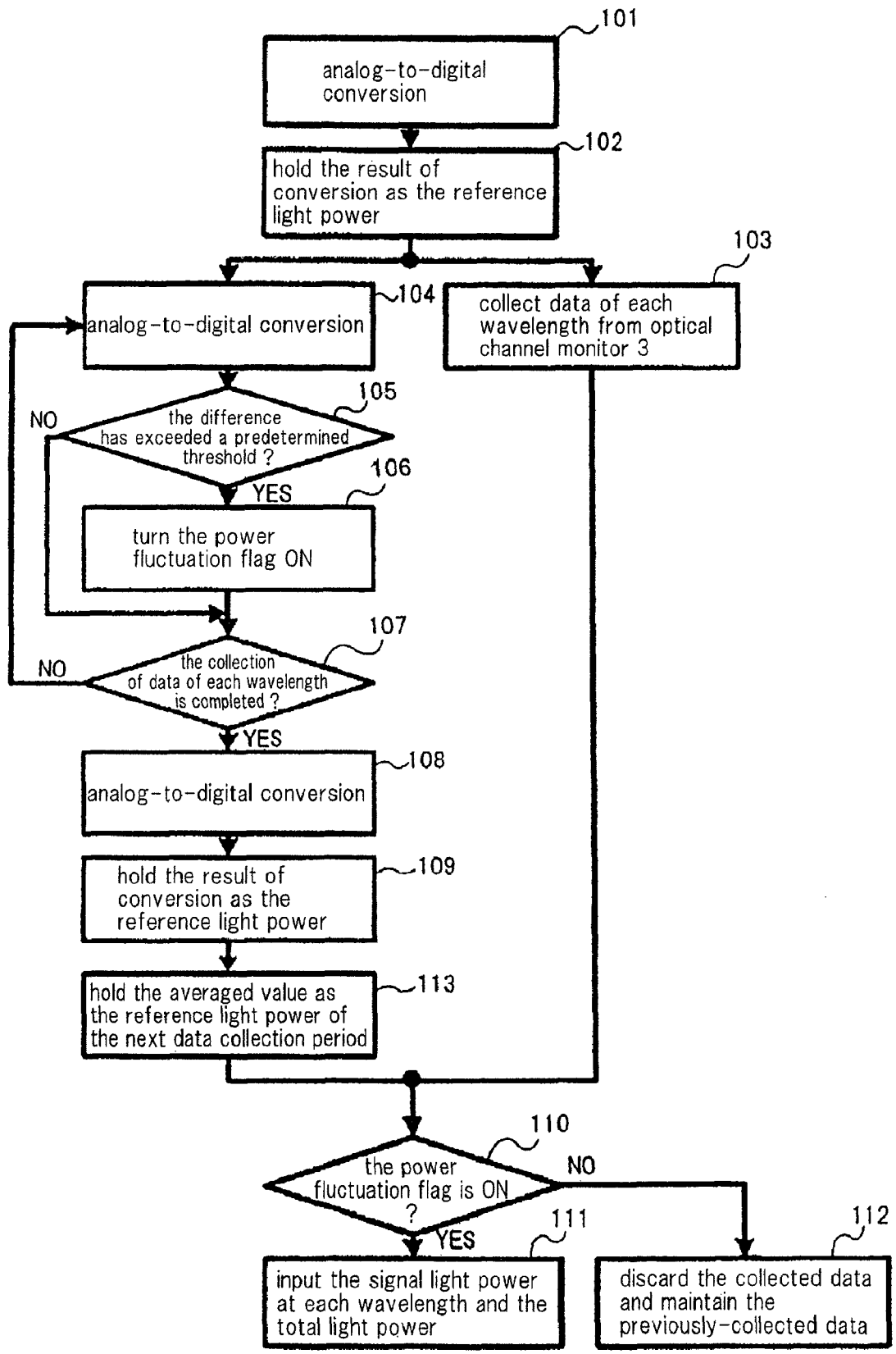
FIG. 4 is a flowchart showing the operation of the transmission apparatus according to a third exemplary embodiment of the present invention.

FIG. 4 is a flowchart showing the operation of a transmission apparatus according to a third exemplary embodiment of the present invention.

The present exemplary embodiment has the same basic configuration as that of the first exemplary embodiment, but differs from the first exemplary embodiment in the manner in which set the reference light power is set. That is, processor 9 averages the result of the analog-to-digital conversion which is performed at the end of the current data collection period and which does not have the fluctuation level above the threshold, and the result(s) of the analog-to-digital conversion(s) which was/were performed at the end of the data collection period(s) immediately before the current data collection period and which did not have a fluctuation level above the threshold, and processor 9 holds the averaged value in register 7 as the reference light power of the next data collection period (step 113). The processings at steps 101 and 102 are performed only during the first data collection period.

Fourth Exemplary Embodiment

Figure 5:
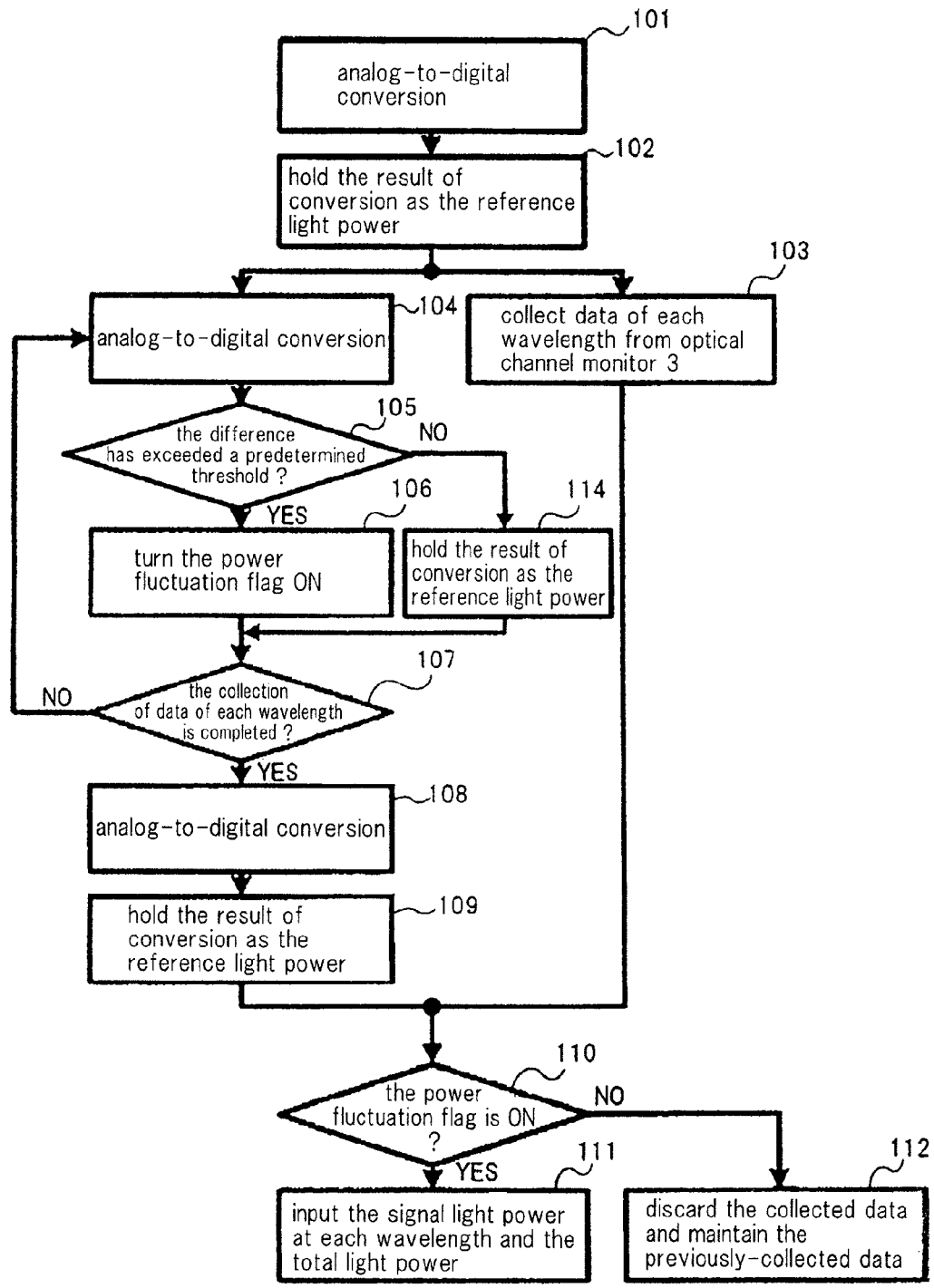
FIG. 5 is a flowchart showing the operation of the transmission apparatus according to a fourth exemplary embodiment of the present invention

FIG. 5 is a flowchart showing the operation of a transmission apparatus according to a third exemplary embodiment of the present invention.

The present exemplary embodiment has the same basic configuration as that of the first exemplary embodiment, but differs from the first exemplary embodiment in the manner in which the reference light power is set. That is, the result of analog-to-digital conversion is successively held in register 7 (step 114), and is used as the reference light power of the next data collection period. The processings of steps 101 and 102 are performed only during the first data collection period.

Fifth Exemplary Embodiment

The processing operation of the transmission apparatus described above according to each of the above embodiments may be carried out by recording a program for performing the functions of the processing operation in a computer-readable recording medium, reading the program thus recorded into a computer. The computer-readable recording medium may refer to a recording medium such as a flexible disk, a CD-ROM, or the like, or a recording medium such as a hard disk drive incorporated in a computer system. The computer-readable recording medium may also refer to a medium for dynamically holding a computer program for a short period of time, e.g., a transmission medium or a transmission wave, for use in applications for transmitting the program through the Internet, or a medium for holding the program for a certain period of time, e.g., a volatile memory in a computer system which operates as a server in such applications.

While preferred embodiments of the present invention have been described using specific terms, such description is for illustrative purposes only, and it is to be understood that changes and variations may be made without departing from the spirit or scope of the following claims.

What is claimed:

1. A method of collecting data from an optical channel monitor for monitoring the power of a wavelength-division multiplexed light signal at each wavelength, the method comprising:
   monitoring a power level of each signal light which enters the optical channel monitor and which is being swept, and
   when fluctuation in the power levels above a predetermined threshold is detected, discarding the power level at each wavelength and a total power level currently collected from said optical channel monitor and maintaining the data that are collected immediately before,
   wherein monitoring power levels includes:
      analog-to-digital conversion of the power;
      comparing the result of the conversion with a predetermined reference light power; and
      determining whether or not the difference between the result of the conversion and the predetermined reference light power exceeds the predetermined threshold, and
   wherein the method further comprises holding the result of the analog-to-digital conversion which is first performed during each data collection period, as the predetermined reference light power.

2. The method according to claim 1, further comprising holding the result of the analog-to-digital conversion which is performed at the end of the current data collection period and which does not have a fluctuation level above said threshold, as said reference light power for the next data collection period.

3. The method according to claim 1, further comprising averaging the result of the analog-to-digital conversion which is performed at the end of the current data collection period and which does not have a fluctuation level above said threshold, and the result(s) of the analog-to-digital conversion(s) which was/were performed at the end of the data collection period(s) immediately before the current data collection period and which do/does not have a fluctuation level above the threshold, and holding the averaged value as the reference light power of the next data collection period.

4. The method according to claim 1, wherein the result of the analog-to-digital conversion which was performed immediately before is used as said reference light power.

5. A transmission apparatus, comprising:
   a photo-detector;
   an optical channel monitor for monitoring the power of a wavelength-division multiplexed light signal at each wavelength
   a first optical coupler for branching part of a wavelength-division multiplexed light signal in a transmission line;
   a second optical coupler for branching the wavelength-division multiplexed light branched from said first optical coupler to said optical channel monitor and to said photo-detector;
   an I/V converter for converting the photo current flowing though said photo-detector into a voltage;
   an A/D converter for quantizing the voltage from said I/V converter;
   a register for holding a predetermined reference light power;
   a comparator for comparing the result of analog-to-digital conversion successively performed by said A/D converter with said reference light power held in said register to determine whether or not the difference between the result of conversion and the predetermined reference light power exceeds a predetermined threshold; and
   a processor for setting said threshold to said comparator, for inputting the result of the determination from said comparator, and when said result indicates that the difference exceeds said threshold, for discarding the light power at each wavelength and the total light power currently collected from said optical channel monitor and maintaining the data that were collected immediately before.

6. The apparatus according to claim 5, wherein said register holds the result of the analog-to-digital conversion which is first performed during each data collection period, as said predetermined reference light power.

7. The apparatus according to claim 5, wherein said register holds the result of the analog-to-digital conversion which is performed at the end of the current data collection period and which does not have a fluctuation level above the threshold, as said reference light power for the next data collection period.

8. The apparatus according to claim 5, wherein said processor averages the result of the analog-to-digital conversion, which is performed at the end of the current data collection period and which does not have a fluctuation level above the threshold, and the result(s) of the analog-to-digital conversion(s) which was/were performed at the end of the data collection period(s) immediately before the current data collection period and which do/does not have a fluctuation level above the threshold, and said register holds the averaged value as the reference light power of the next data collection period.

9. The apparatus according to claim 5, wherein said register holds the result of the analog-to-digital conversion which was performed immediately before it is used as said reference light power.

* * * * *